(12) United States Patent
Sasano et al.

(10) Patent No.: US 6,622,808 B2
(45) Date of Patent: Sep. 23, 2003

(54) RESIN MOLDING FOR VEHICLE USE AND MANUFACTURING METHOD THEREOF

(75) Inventors: Norihisa Sasano, Ama-gun (JP); Ikuo Ozawa, Toyoake (JP); Noriaki Maeda, Kariya (JP); Toshiki Sugiyama, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/826,568

(22) Filed: Apr. 5, 2001

(65) Prior Publication Data

US 2001/0027883 A1 Oct. 11, 2001

(30) Foreign Application Priority Data

| May 1, 2000 | (JP) | ............................. | 2000-137157 |
| Apr. 10, 2000 | (JP) | ............................. | 2000-108317 |
| Jul. 6, 2000 | (JP) | ............................. | 2000-205527 |

(51) Int. Cl.$^7$ ............................................. B60K 11/04
(52) U.S. Cl. ..................... 180/68.3; 180/68.6; 296/189
(58) Field of Search ............................. 180/68.1, 68.3, 180/68.4, 68.6; 165/134.1; 293/115, 117; 296/194, 189, 203.02

(56) References Cited

U.S. PATENT DOCUMENTS

| 3,995,901 | A | * | 12/1976 | Filbert, et al. | ............... | 188/377 |
| 4,029,350 | A | * | 6/1977 | Goupy et al. | ............... | 165/149 |
| 4,403,648 | A | * | 9/1983 | Styok | ............... | 180/68.6 |
| 4,424,996 | A | * | 1/1984 | Yoshiyuki | ............... | 180/68.4 |
| 5,143,516 | A | | 9/1992 | Christensen | | |
| 5,271,473 | A | * | 12/1993 | Ikeda et al. | ............... | 293/155 |
| 5,409,288 | A | * | 4/1995 | Masuda | ............... | 267/140 |
| 5,507,540 | A | * | 4/1996 | Pernot | ............... | 296/194 |
| 6,186,583 | B1 | * | 2/2001 | Martin | ............... | 293/136 |
| 6,199,937 | B1 | * | 3/2001 | Zetouna et al. | ............... | 165/69 |
| 6,290,272 | B1 | * | 9/2001 | Braun | ............... | 296/188 |
| 6,298,908 | B1 | * | 10/2001 | Harrell et al. | ............... | 293/102 |
| 6,364,403 | B1 | * | 4/2002 | Ozawa et al. | ............... | 296/188 |

FOREIGN PATENT DOCUMENTS

| JP | A-7-69242 | 3/1995 |
| JP | 11-129935 | 5/1999 |
| JP | A-11-139343 | 5/1999 |
| JP | A-11-180342 | 7/1999 |
| WO | WO 99/54187 | 10/1999 |

* cited by examiner

*Primary Examiner*—Brian L. Johnson
*Assistant Examiner*—Kelly E Campbell
(74) *Attorney, Agent, or Firm*—Harness, Dickey & Pierce, PLC

(57) ABSTRACT

The flexible section 452 made of rubber or elastomer is molded integrally with the panel body 450 on the forward end side of the guide duct section 451 of the panel body made of resin, and the seal section 461 for tightly closing gap δ between the panel body 450 and the heat exchanger 21 is molded integrally with the panel body 450 on the introduction opening section 460 side in the panel body 450. Due to the foregoing, it is possible to prevent the panel body 450 and the guide duct section 451 from being damaged in the case of a light collision. Therefore, a repair cost, which must be paid by a vehicle owner, is reduced and an increase in the number of parts of the front end structure and an increase in the cost of assembling are suppressed even though gap δ between the panel body 450 and the heat exchanger 21 is tightly closed so that a decrease in the heat radiating capacity (heat exchange capacity) of the heat exchanger 21 can be prevented. Improvements are made so that the mechanical strength at a joining face of a resin molding molded by integrally molding the guide duct section 451 and the flexible section 452 can be enhanced and the deformation of parts can be prevented.

14 Claims, 14 Drawing Sheets

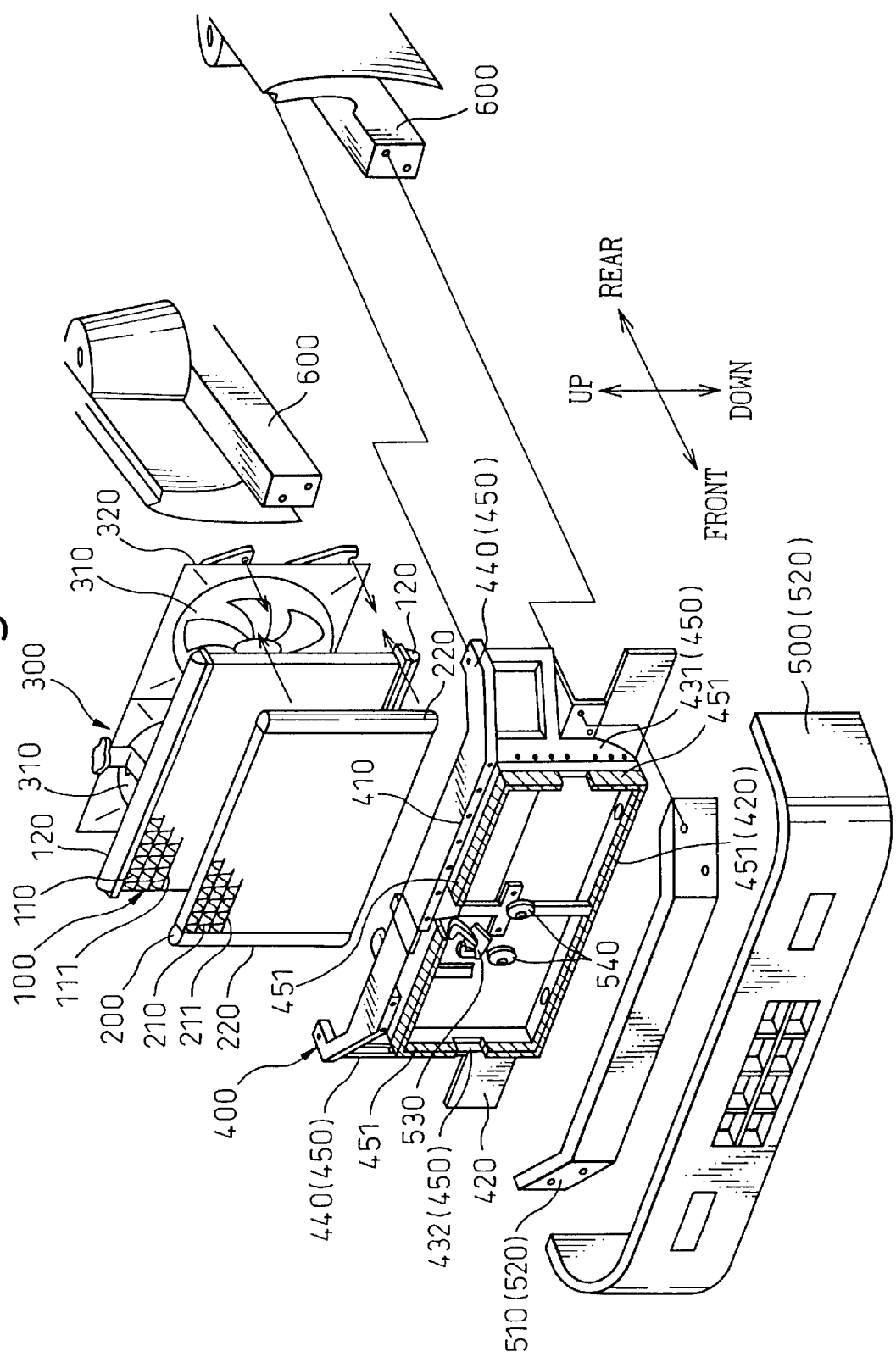

Fig.5
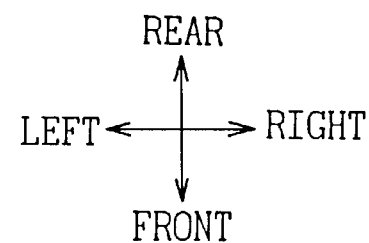
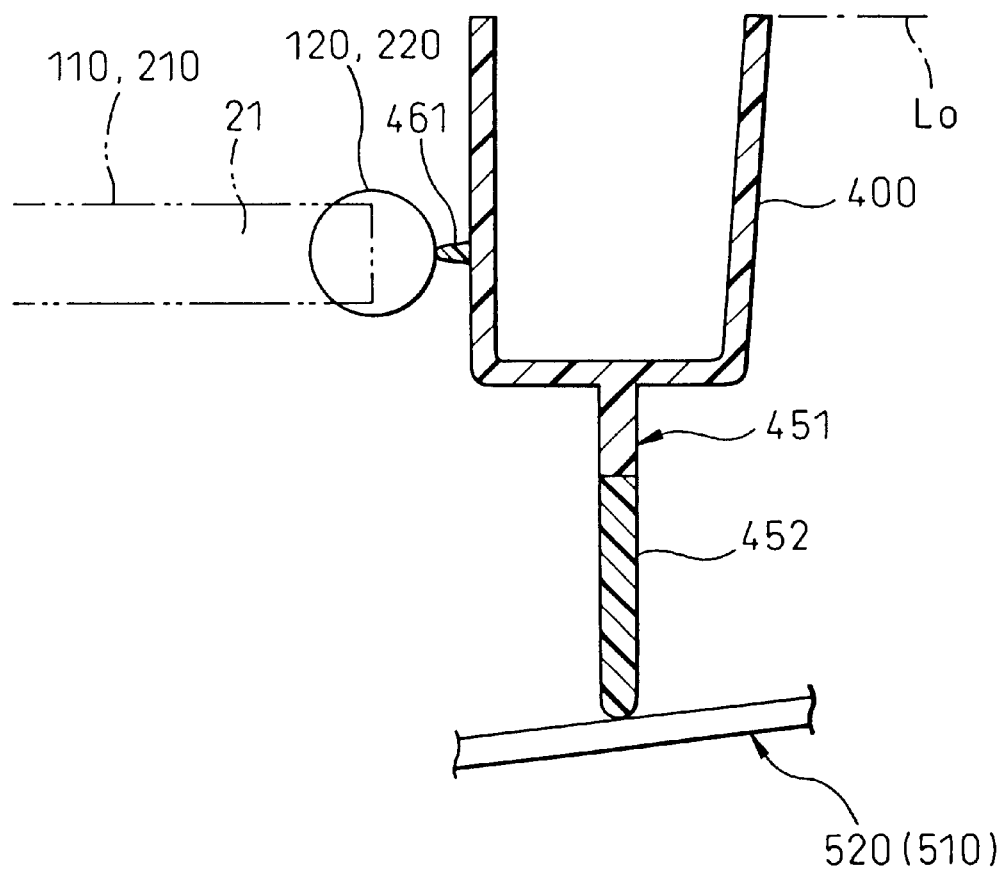

THE WHOLE IS INJECTED WITH PRESSURE AND COMPRESSED

⟨BEING MOLDED⟩

COMPRESSED SOFT MATERIAL MEMBER

⟨BEING PICKED UP⟩

SOFT MATERIAL MEMBER RELEASED FROM MOLD

RESIN MOLDING FOR VEHICLE USE AND MANUFACTURING METHOD THEREOF

BACKGROUND OF THE INVENTION

1. Field of the Invention

The present invention relates to a resin molding for vehicle use and a manufacturing method thereof. More particularly, the present invention relates to a resin molding for vehicle use, and a manufacturing method thereof, preferably applied to a front end panel which is arranged on the front end side of a vehicle and into which a heat exchanger such as a radiator is incorporated.

2. Description of the Related Art

For example, according to Japanese Unexamined Patent Publication No. 11-129935, there is provided a front end panel on which a panel body, into which a radiator is incorporated, and a guide duct section provided on the front side of a vehicle are integrally molded into one body. In this connection, the guide duct section is a duct-shaped member for guiding cooling air, which flows past a running vehicle, to the radiator.

However, according to the invention described in the above unexamined patent publication, the panel body and the guide duct section are simply integrated into one body with each other. Therefore, for example, in the case of a light collision of a vehicle, there is a high possibility that the panel body section is damaged together with the guide duct section.

When the panel body section is damaged, the entire front end panel must be replaced with a new one. Therefore, the repair of the vehicle is very expensive and must be paid for by the vehicle owner.

In this connection, when a gap exists between the heat exchanger and the panel body section, a portion of air guided by the guide duct to the heat exchanger such as a radiator flows onto the downstream side in such a manner that a portion of the air makes a detour in the periphery of the heat exchanger. Therefore, the quantity of air passing through the heat exchanger is decreased. As a result, the radiating capacity (heat exchanging capacity) is lowered.

In order to solve the above problems, it is possible to consider a means for tightly closing the gap between the heat exchanger and the panel body section with foaming resin such as urethane foam. However, this means is disadvantageous in that the number of parts and the cost of assembly increase.

In order to solve the above problems, in the present invention, on the forward end side of the guide duct section of the panel body section made of hard resin, there is provided a flexible section made of a flexible soft material, the mechanical strength of which is lower than that of the hard resin, integrally molded together with the guide duct section.

However, conventionally, in the case of forming an insert resin molding made of soft material such as elastomer, as shown in FIG. 14, the soft material member 1 is set in the cavity 5 formed between the upper metallic mold 3 and the lower metallic mold 4, and the molding resin 2 is introduced into this cavity 5 by means of injection molding, and then the thus molded object is picked up so as to provide a resin molding made of the soft material 1. According to this conventional method, the following problems may be encountered. The plane direction of the soft material member 1 to be inserted and the plane direction C of the molding resin 2 coincide with each other as shown in FIG. 14. Therefore, a strong resin pressure of the melt resin is given to the inserted soft material member 1. Therefore, the soft material member 1 is compressed and deformed in the metallic mold, and further the melt resin gets into the soft material member 1 as shown in FIG. 14. When the melt resin gets into the soft material member 1 as shown in FIG. 14, the soft material member 1 of the insert resin molding is partially deformed as shown in FIG. 14.

In the case where a resin molding of a soft material is formed by the method of multi-color injection molding in which two types of materials, the colors or materials of which are different from each other, are respectively and successively charged into a metallic mold, as shown in FIG. 15, the soft material member 1 adhering to the molding resin 2 is restricted by the molding resin 2, so that contraction of the soft material member 1 is suppressed. However, an end portion of the soft material member 1 is not restricted. Therefore, the end portion of the soft material member 1 is greatly contracted. Since the contraction is not uniform, the soft material member 1 is deformed.

Further, according to the common manufacturing method (multi-color injection molding method) of manufacturing a resin molding made of resin materials of not less than two types, for example, as described in Japanese Examined Patent Publication No. 2-8572, a boundary face of resin is flat.

Therefore, the following problem may be encountered. Since a contact area of resin on the boundary face is small, it is difficult to increase the joining strength of the resin.

SUMMARY OF THE INVENTION

The present has been accomplished to solve the above problems. It is a first object of the present invention to prevent damage to a panel body section and guide duct section by absorbing an impact force and reducing collision energy acting on the panel body when a flexible section is deformed even if the impact force acts on a bumper section, in the case of a light collision of a vehicle.

The aforementioned problems are caused because resin molding pressure is given in the plane direction of a soft material member to be inserted in the insert molding of a soft material member. From the above viewpoint, a second object of the present invention is established. It is a second object of the present invention to prevent the deformation of a flexible material section of a soft material member of a resin molding by not applying the molding resin pressure in the plane direction of the soft material member to be inserted.

In the resin molding of a soft material member conducted by the method of multi-color injection molding, a great deformation of the soft material member is caused by a difference between the contraction of an adhesion section of the soft material member with the molding resin and the contraction of an end section in which the soft material member is open. The present invention has been accomplished in the above viewpoint. It is a third object of the present invention to prevent the deformation of a flexible material section of a soft material member of a resin molding by decreasing this contraction force.

It is a fourth object of the present invention to increase a joining strength of resin on a boundary face.

In order to accomplish the above objects, the present invention provides a front end panel arranged on the rear side of a bumper section (520) to absorb an impact force acting on the front side of a vehicle, into which at least a heat exchanger (21) is incorporated, comprising: a panel body section (450) made of resin into which the heat exchanger (100, 200) is incorporated; a guide duct section (451) integrally molded on the front side of the panel body section (450) of the vehicle and protruded onto the front side of the vehicle so as to guide air into the heat exchanger (100, 200); and a flexible section (452) arranged on the forward end side of the guide duct section (451) and integrally molded together with the guide duct section (451), the flexible section (452) being made of flexible material, the mechanical strength of which is lower than that of the panel body section (450).

Due to the above structure, even if an impact force (collision force) acts on the bumper section (520), the collision force can be absorbed when the flexible section (452) is deformed. Accordingly, an intensity of collision energy acting on the panel body (450) can be reduced. Accordingly, it is possible to prevent the panel body section (450) and the guide duct section (451) from being damaged in the case of a light collision. Therefore, it is possible to decrease the cost of a repair which must be paid by the owner of the vehicle.

In this connection, the front end section of a vehicle is composed of a plurality of parts such as a front end panel, bumper section (520) and so forth. Accordingly, depending upon the fluctuation of the size of each part, there is a possibility that the guide duct section (451) and the bumper section (520) interfere with each other and it becomes impossible to incorporate the front end panel and the bumper section (520) into the front end section of the vehicle.

In order to solve the above problem, it is possible to take a countermeasure in which the manufacturing tolerance of each part is strictly managed in the manufacturing process. However, when the above countermeasure is adopted, the manufacturing costs of the front end panel and the bumper section (520) may be increased.

However, according to the present invention, the flexible section (452) is provided on the forward end side of the guide duct section (451). Therefore, even if the guide duct section (451) and the bumper section (520) interfere with each other, the fluctuation of the size can be absorbed when the flexible section (452) is bent. Accordingly, the front end panel and the bumper section (520) can be easily incorporated.

Consequently, the assembling property of the front end panel and the bumper section (520) can be enhanced without raising the manufacturing costs of the front end panel and the bumper section (520).

The present invention provides a front end panel having a panel body (450) made of resin into which at least a heat exchanger (21) is incorporated, wherein a deformable seal section (461) for tightly closing a gap (δ) between the panel body (450) and the heat exchanger (21) is molded integrally with the panel body (450).

Due to the above structure, it is possible to tightly close a gap between the heat exchanger (21) and the panel body section (450) without causing an increase in the number of parts and an increase in the cost of assembly.

In this connection, it is preferable that the mechanical strength of the seal section (461) is lower than that of the panel body section (450) and also it is preferable that the seal section (461) is made of material having flexibility.

In the resin molding of the present invention, in the melting section between the soft material member section (flexible section and seal section) and the molding resin section (panel body section), a step portion is provided in the direction of the planes of both the soft material member section and the molding resin section. Due to the foregoing, it is possible to avoid a case in which the molding resin pressure is strongly given to the inserted soft material member in its plane direction. Accordingly, deformation of the soft material member section of the resin molding can be prevented.

In the resin molding of the present invention, a forward end portion of the soft material member section of the resin molding is corrugated in the multi-color injection molding of the soft material member. Due to the foregoing, a contraction force at the forward end portion of the soft material member section is reduced, so that the soft material member section is prevented from being greatly deformed.

In the resin molding of the present invention, a belt-shaped hard resin section is provided approximately in parallel with the melting section in the soft material member section. Due to the above structure, contraction of the forward end portion of the soft material member section is suppressed by this belt-shaped hard resin section so as to prevent the occurrence of deformation.

In the resin molding of the present invention, a large number of slits are provided in the soft material member section. Due to the above structure, contraction of the forward end portion of the soft material member section can be distributed to each portion divided by the slits. Therefore, deformation of the forward end portion of the soft material member section can be suppressed.

In the resin molding of the present invention, the soft material member section is molded by the method of injection compression molding. Therefore, contraction of the soft material member section is concentrated in the direction of thickness and contraction of the soft material member section is suppressed in the direction of the plane so as to suppress the deformation of the soft material member section.

The present invention provides a fiber reinforced resin product composed of a reinforced resin section (panel body section) (P1) made of fiber reinforced resin, in which fibers are mixed so as to enhance the mechanical strength, and a simple resin section (flexible section) (P2) made of simple resin in which fibers are not mixed, the fibers protruding at random from the reinforced resin section (P1) to the simple resin section (P2) on a boundary surface (BS) between the reinforced resin section (P1) and the simple resin section (P2).

Due to the foregoing, it is possible to increase a contact area of the reinforced resin with the simple resin. Therefore, it becomes possible to increase a joining strength of the fiber reinforced resin to the simple resin without increasing the manufacturing cost of the fiber reinforced resin molding.

Further, the present invention provides a method of manufacturing a fiber reinforced resin product composed of a reinforced resin section (panel body section) (P1) made of fiber reinforced resin, in which fibers are mixed so as to enhance the mechanical strength, and a simple resin section (flexible section) (P2) made of simple resin in which fibers are not mixed, the method of manufacturing the fiber reinforced resin product comprising the step of filling up the fiber reinforced resin in a portion corresponding to the boundary surface (BS) between the reinforced resin section (P1) and the simple resin section (P2) before the simple resin is filled up under the condition that the flowing resistance of the fiber reinforced resin becomes higher than that of other portions.

Due to the foregoing, the boundary surface (BS) becomes a free surface not restricted by the metallic mold, and its flow stops. On the boundary surface (BS), fibers are protruded at random from the reinforced resin section (P1) to the simple resin section (P2), that is, the surface becomes fluffy.

Accordingly, it becomes possible to increase a contact area of the reinforced resin with the simple resin. Therefore, the joining strength of the fiber reinforced resin section (fiber reinforced resin) to the simple resin section (simple resin) can be enhanced without increasing the manufacturing cost of the fiber reinforced resin molding.

The present invention may be more fully understood from the description of preferred embodiments of the invention set forth below, together with the accompanying drawings.

BRIEF DESCRIPTION OF THE DRAWINGS

FIG. 1 is an exploded perspective view of a front end section of a vehicle into which a front end panel of an embodiment of the present invention is incorporated.

FIG. 5 is a cross-sectional view of a guide duct section of still another embodiment of the present invention.

DESCRIPTION OF THE PREFERRED EMBODIMENTS

Figure 2A:
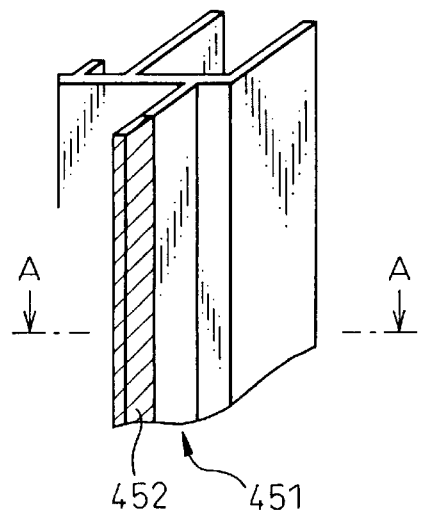
FIG. 2A is a perspective view of a front end panel section and guide duct section of an embodiment of the present invention.

In this embodiment, the front end section of a vehicle includes: a radiator for cooling water in an engine (internal combustion engine) used for driving the vehicle; a condenser incorporated into a refrigerating cycle (air-conditioner) for vehicle use; and a fan unit for blowing a cooling wind to the radiator and condenser. These parts are incorporated into the front end section as parts of the front end section of the vehicle. FIG. 1 is an exploded perspective view of a front end structure, in which a front end panel is used, of an embodiment of the present invention.

In FIG. 1, reference numeral 100 is a radiator, reference numeral 200 is a condenser, and reference numeral 300 is a fan unit. The fan unit 300 includes: axial fans 310, 310; and a shroud 320 for closing a gap formed between the radiator 100 and the axial fans 310 so that air cannot be circulated before and after the axial fans 310, that is, air cannot be bypassed through the gap.

In this connection, the devices including the radiator 100, condenser 200 and fan unit 300, which are incorporated into the front end section of a vehicle, are generically referred to as a vehicle front end part 123 in this specification.

In this connection, the radiator 100 is a well known multiple flow type heat exchanger including: a radiator core 110 composed of a plurality of radiator tubes 111 in which cooling water circulates; and radiator tanks 120 arranged on both end sides of the radiator tubes in the longitudinal direction and communicated with the radiator tubes.

In the same manner as that of the radiator 100, the condenser 200 includes: a condenser core 210 composed of a plurality of condenser tubes 211 in which refrigerant flows; and condenser tanks 220 arranged on both end sides of the condenser tubes 211 in the longitudinal direction and communicated with the condenser tubes 211.

Reference numeral 400 is a front end panel, which will be referred to as a panel hereinafter, made of resin to which the vehicle front end part 123 is incorporated and fixed. This panel 400 includes: an upper beam 410 located on the upper side and extending in the horizontal direction; a lower beam 420 located on the lower side and extending in the horizontal direction, the lower beam 420 functioning as a guide duct 451 described later; and a first 431 and a second pillar 432 extending in the vertical direction and connecting both the beam members 410, 420.

In this embodiment, a rectangular body, which is composed of both the beam members 410, 420, the first 431 and the second pillar section 432 and the bracket section 440, is referred to as a panel body 450.

In this connection, on the front side of the panel body section 450, there is provided a frame-shaped guide duct section (one body type guide duct section) 451, which is protruded onto the front side of a vehicle, for guiding cooling air into the condenser 200 and the radiator 100 which will be generically referred to as a heat exchanger 21 hereinafter. This guide duct section 451 is made of resin (glass fiber reinforced polypropylene in this embodiment) and molded integrally with the panel body 450.

Figure 2B:
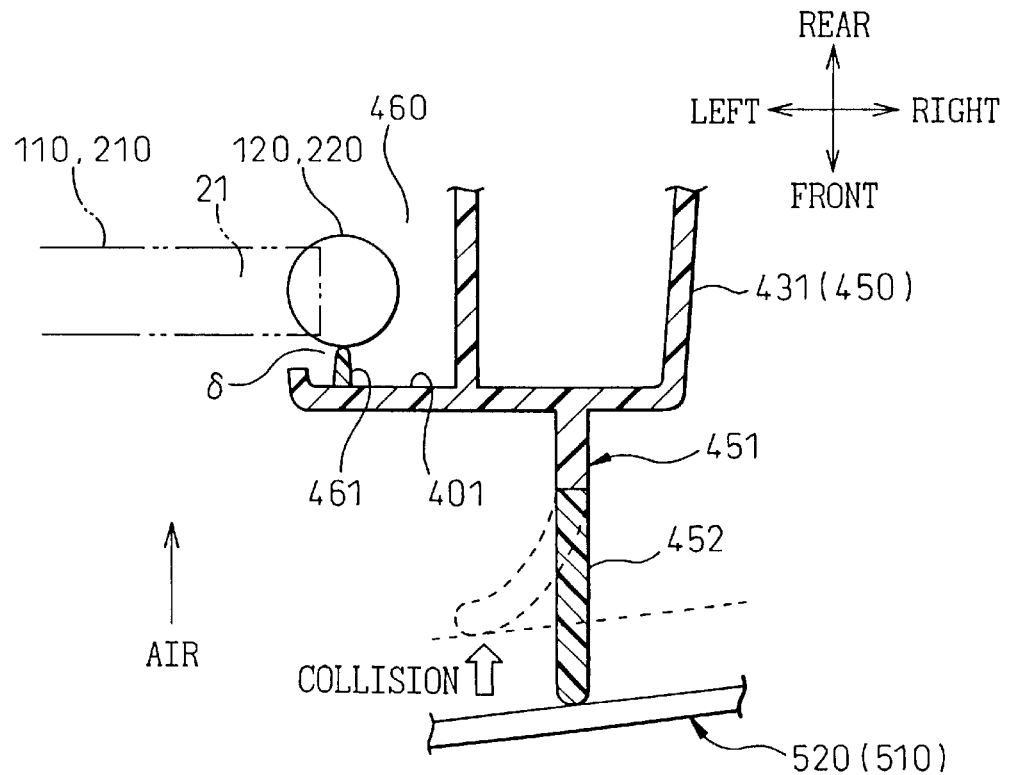
FIG. 2B is a cross-sectional view of a guide duct section of an embodiment of the present invention.

As shown in FIGS. 2A and 2B, on the forward end side of the guide duct section 451, there is provided a flexible section (soft material section) 452 integrally molded of flexible material (rubber or elastomer in this embodiment). In this connection, the flexible section 452 is molded integrally with the guide duct section 451 by the inert molding method or the multi-color injection molding method.

In FIG. 2B, reference numeral 460 is an introduction opening section in which the heat exchanger 21 is arranged and cooling air (vehicle running wind) guided by the guide duct section 451 flows. On the introduction opening section 460 side of the panel body section 450, there is provided a deformable seal section 461, which is molded integrally with the introduction opening section 46, for tightly closing the gap δ between the panel body 450 and the heat exchanger 21. In the same manner as that of the flexible section 451, this seal section 461 is made of flexible material (rubber or elastomer in this embodiment), the mechanical strength of which is lower than that of the panel body section 450, and molded by the insert molding method or the multi-color injection molding method being integrated with the panel body 450.

The seal section 461 is molded in such a manner that it is protruded from the panel body 450 to the rear side (the heat exchanger 21 side) of the vehicle on the surface 401 which is parallel with the direction (direction parallel with the core face of the heat exchanger 21) perpendicular to the flowing direction of air flowing in the heat exchanger 21 in the panel body 450.

In this connection, reference numeral 500 is a bumper, which is made of metal, arranged on the front side of the vehicle with respect to the panel 400 and extending in the vehicle width direction and absorbing an impact force (collision force) which acts on the front side of the vehicle. Reference numeral 510 is a bumper cover made of resin extending in the vehicle width direction in such a manner that the bumper cover covers the bumper 500. The bumper 500 and the bumper cover 510 compose the bumper section 520.

In this connection, the bumper 500 and the panel 400 are fixed to the body (side member) 600 made of iron on the side of the vehicle by a fastening means such as bolts. Concerning the vehicle front end part 123, the condenser 200 and the fan unit 300 are assembled and fixed to the radiator 100 by a fastening means such as bolts, and the thus obtained one part (one unit) is assembled to the panel 400.

Reference numeral 520 is a hood lock for opening and closing a bonnet (bonnet hood) which closes the engine compartment 520. Reference numeral 540 is a horn for giving a sound of warning.

Next, the characteristics of the present embodiment will be described.

Since the flexible section 452 is provided on the forward end side of the guide duct section 451, even if an impact force (collision force) acts on the bumper section 520, the collision force can be absorbed when the flexible section 452 is elastically deformed as shown in FIG. 2B. Accordingly, an intensity of collision energy acting on the panel body 450 can be reduced. Accordingly, it is possible to prevent the panel body section 450 and the guide duct section 451 from being damaged in the case of a light collision. Therefore, it is possible to decrease a repair cost which must be paid by an owner of the vehicle.

On the introduction opening section 460 side of the panel body 450, the seal section 461 for tightly closing the gap δ between the panel body 450 and the heat exchanger 21 is integrally molded. Therefore, it is easy to tightly close the gap δ without increasing the number of parts of the front end structure and the cost necessary for assembling.

As explained above, according to the present embodiment, in the case of a light collision, damage to the panel body 450 and the guide duct section 451 is prevented so that a repair cost which must be paid by an owner of the vehicle can be decreased. Further, while an increase in the number of parts of the front end structure is suppressed and also an increase in the cost necessary for assembling is reduced, the gap δ between the panel body 450 and the heat exchanger 21 is tightly closed so that the heat radiating capacity of the heat exchanger 21 can be prevented from lowering.

In this connection, since the vehicle front end section is composed of a plurality of parts such as a panel 400 and bumper section 520, when the sizes of the parts fluctuate, the guide duct section 451 and the bumper section 520 (bumper 500) interfere with each other, and it becomes impossible to incorporate the panel 400 and the bumper section 520 into the vehicle front end section.

In order to solve the above problems, it is considered to adopt a means to strictly manage the manufacturing tolerance of each part. However, when this means is adopted, there is a possibility that the manufacturing costs of the panel 400 and the bumper section 520 are increased.

However, in this embodiment, since the flexible section 452 is provided on the forward end side of the guide duct section 451, even if the guide duct section 451 and the bumper section 520 (bumper 500) interfere with each other, the fluctuation of the size can be absorbed when the flexible section 452 is bent, and the panel 400 and the bumper section 520 can be easily incorporated. Accordingly, the manufacturing costs of the panel 400 and the bumper section 520 are not raised, and the property of incorporating the panel 400 and the bumper section 520 can be enhanced.

When the flexible section 452 is bent by positively making the flexible section 452 come into contact with the bumper section 520 (bumper 500), a gap formed between the panel 400 and the bumper section 520 can be tightly closed. Accordingly, it possible to prevent the occurrence of a case in which cooling air introduced from the guide duct section 451 flows in the gap formed between the panel 400 and the bumper section 520 and makes a detour round the heat exchanger 21. Consequently, it is possible to prevent the heat radiating capacity (heat exchanging capacity) of the heat exchanger 21 from lowering.

The seal section 461 is formed on a plane 401 which is parallel with the direction (vehicle width direction) perpendicular to the flowing direction (longitudinal direction of the vehicle) of air which flows in the heat exchanger 21 incorporated into the panel body 450. Therefore, the mold splitting face of the metallic mold for molding the panel 400 is in the direction perpendicular to the flowing direction of air (direction parallel with the core face of the heat exchanger 21).

Therefore, the releasing direction of the metallic mold (not shown) for molding the seal section 461 is the same as the flowing direction of air (longitudinal direction of the vehicle). Accordingly, the mold structure can be made simple, and the manufacturing cost of the panel 400 into which the seal section 461 is integrally incorporated by molding can be reduced.

Figure 3:
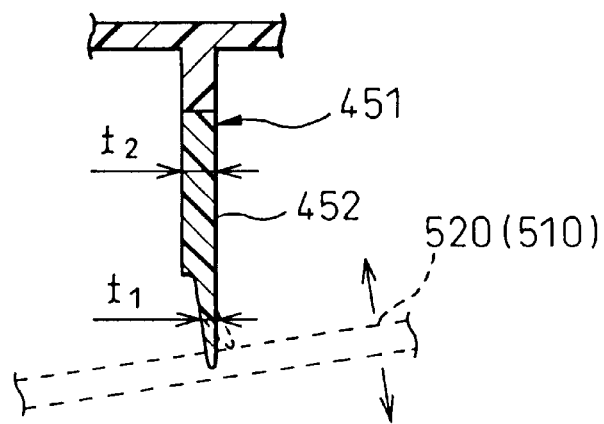
FIG. 3 is a cross-sectional view of a guide duct section of another embodiment of the present invention.

As shown in FIG. 3, another embodiment of the present invention is composed in such a manner that wall thickness t1 on the forward end side of the flexible section 452 is smaller than wall thickness t2 on the root side.

Due to the above structure, rigidity of the flexible section 452 on the forward end side is decreased, and the forward end side of the flexible section 452 can be more easily bent than the root side. Therefore, fluctuation of the size of the panel 400 and the bumper section 520 can be more positively absorbed, and the panel 400 and the bumper section 520 can be more easily incorporated.

Since the flexible section 452 can be contacted with the bumper section 520 while the flexible section 452 is being bent, it becomes possible to increase the contact face pressure between the flexible section 452 and the bumper section 520. Accordingly, it becomes possible to positively close the gap formed between the panel 400 and the bumper section 520.

Figure 4:
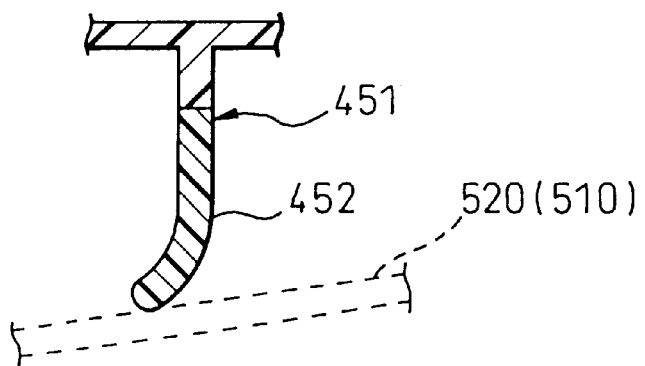
FIG. 4 is a cross-sectional view of a guide duct section of still another embodiment of the present invention.

As shown in FIG. 4, still another embodiment of the present invention is composed in such a manner that the forward end side of the flexible section 452 is previously curved so that the angle formed between the forward end side of the flexible section 452 and the longitudinal direction (vehicle width direction) of the bumper section 520 can be smaller than 90°.

Due to the above structure, when the panel 400 and the bumper section 520 are incorporated, the forward end side of the flexible section 452 comes into contact with the bumper section 520 (the forward end side of the flexible section 452 interferes with the bumper section 520) while the forward end side of the flexible section 452 is inclined with respect to the longitudinal direction of the bumper section 520. Therefore, when the flexible section 452 comes into contact with the bumper section 520 (the flexible section 452 interferes with the bumper section 520), a bending moment acts on the flexible section 452.

Accordingly, the flexible section 452 can be easily bent. Therefore, fluctuation of the size of the panel 400 and the bumper section 520 can be more positively absorbed, and the panel 400 and the bumper section 520 can be easily incorporated.

In this connection, since the flexible section 452 can be contacted with the bumper section 520 while the flexible section 452 is being bent, the gap formed between the panel 400 and the bumper section 520 can be positively closed in the same manner as that of the above embodiment.

As shown in FIG. 5, still another embodiment of the present invention is composed in such a manner that the seal section 461 is molded at a portion corresponding to the mold splitting face Lo of the metallic mold (not shown) for molding the panel body 450.

Due to the above structure, it is possible to mold the panel 400, the seal section 461 of which is integrally molded into one body by the mold which moves upward in FIG. 5 with respect to the mold splitting face Lo and by the mold which moves downward in FIG. 5 with respect to the mold splitting face Lo. Accordingly, it is unnecessary to use a movable mold such as a slide core. Therefore it is possible to conduct molding by a simple mold structure. As a result, the manufacturing cost of the panel 400 with which the seal section 461 is integrally molded can be reduced.

In the above embodiment, the seal section 461 is integrally molded with the panel body 450. However, it is possible to adopt a structure in which the seal section 461, which has been differently made, is attached to the panel body 450 by means of adhesion such as adhesive. In this case, at least the flexible section 452 must be integrally molded with the panel body 450.

In the above embodiment, the flexible section 452 is molded being integrated with the panel body 450. However, it is possible to adopt a structure in which the flexible section 452 which has been differently made, is attached to the panel body 450 (guide duct section 451) by means of adhesion using an adhesive. In this case, at least the seal section 461 must be integrally molded with the panel body 450.

In the above embodiment, the seal section 461 comes into contact with the heat exchanger 21. However, it should be noted that the present invention is not limited to the above specific embodiment. As long as the sealing property is not greatly deteriorated, a gap may exist between the seal section 461 and the heat exchanger 21.

Next, referring to FIGS. 6 to 13, explanations will be made into a preferable profile of a resin molding panel, for example, composed of a panel body, which is made of hard resin, and a flexible section or seal section, which is made of soft material, which is an embodiment of the present invention.

Figure 6:
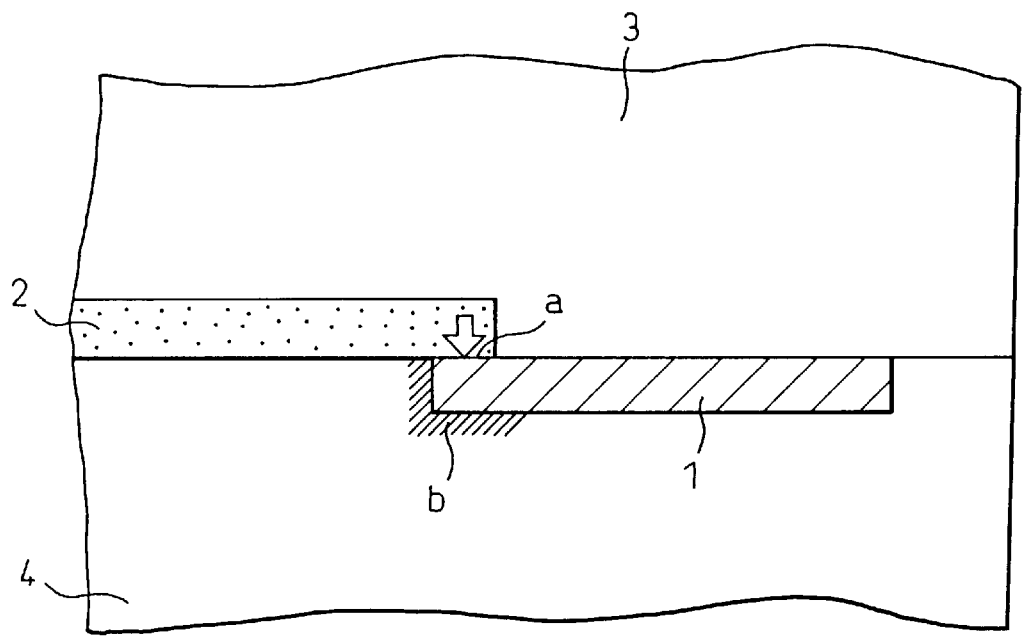
FIG. 6 is a schematic illustration for explaining a concept of molding work of a resin molding of a soft material member by the insert molding method of an embodiment of the present invention.

FIG. 6 is a schematic illustration for explaining a concept of molding operation of a resin molding of a soft material member by the insert molding method which is an embodiment of the present invention. As shown in the drawing, in a cavity of the mold formed by the upper metallic mold 3 and the lower metallic mold 4, the soft material member 1 to be inserted is set, and molding resin 2 is injected into this cavity with pressure. This soft material member 1 comes into contact with the molding resin 2 so that a step portion can be provided on the plane direction. That is, in FIG. 6, the metallic mold is composed in such a manner that a left end portion on the upper face of the soft material member 1 comes into contact with a right end portion on the lower face of the molding resin 2.

The wall thickness of the portion of the soft material member 1 coming into contact with the molding resin 2 is made small so that the molding resin pressure can be received by the metallic mold.

Due to the above structure, the pressure of the molding resin 2, which has melted and has flowed after injection, is given to portion "a" (shown in FIG. 6) of the soft material member 1. Therefore, this pressure can be received by hatched portion "b" (shown in FIG. 6) of the metallic mold. Therefore, the soft material member 1 in the metallic mold is not given a strong compression force in the longitudinal direction. Accordingly, it is possible to obtain a resin molding (panel) in which no deformation is caused in the soft material member section (flexible section or seal section) 1.

Figure 7:
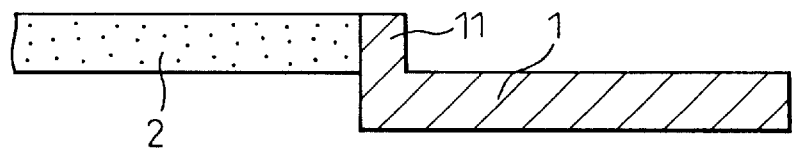
FIG. 7 is a view showing another embodiment of a resin molding of a soft material member made by the insert molding method.
Figure 8:
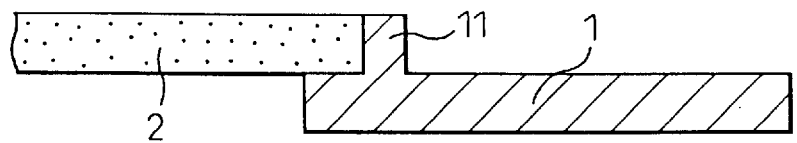
FIG. 8 is a view showing still another embodiment of a resin molding of a soft material member made by the insert molding method.

FIGS. 7 and 8 are views respectively showing a different embodiment of the resin molding made by the insert molding method which is the embodiment of the present invention. In the resin molding shown in FIG. 7, a rising section 11 is formed at one end of the soft material member 1, and the rising section 11 and the forward end of the molding resin section (panel body section) 2 are contacted with each other and melted. In this resin molding, molding resin pressure is received by the metallic mold coming into contact with the rising section 11 on the opposite side to the melting section and also received by the metallic mold coming into contact with the bottom section of the rising section 11. Therefore, the soft material member 11 is not given a strong compression force in the longitudinal direction, and the soft material member 1 can be prevented from being deformed. In the resin molding shown in FIG. 8, the rising section 11 is formed close to one end of the soft material member 1. The end portion of the molding resin section 2 is contacted and melted with an L-shaped portion formed by the side of the rising section 11 and the upper face of the soft material member 1 which continues from the rising section 11 to one end portion. In this resin molding, in the same manner as that shown in FIG. 7, the soft material member 1 is not given a strong compression force in the longitudinal direction. Therefore, the soft material member 1 can be prevented from being deformed. In this connection, it is clear that a step portion is formed in the plane direction of the soft material member section 1 and the molding resin section 2 in the melting section between the soft material member section (flexible section or seal section) 1 of the resin molding and the molding resin section (panel body) 2 in the embodiments shown in FIGS. 7 and 8.

Figure 9A:
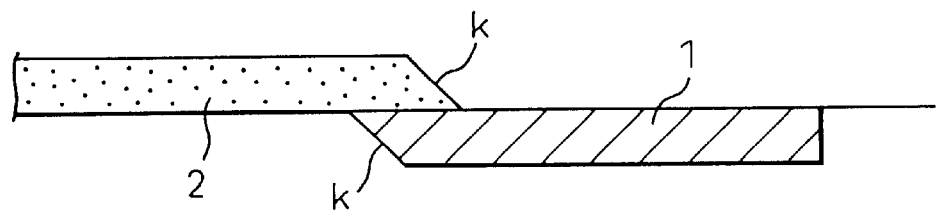
FIGS. 9A to 9D are views showing other four embodiment of a resin molding of a soft material member made by the insert molding method.
Figure 9B:
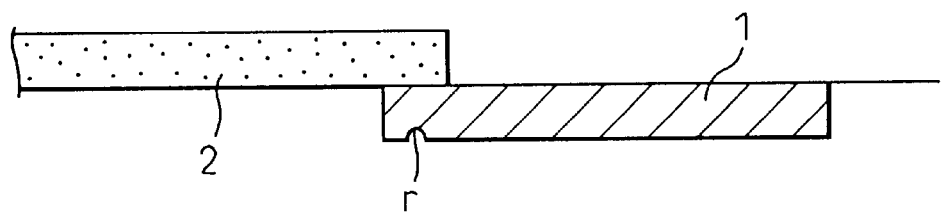
Figure 9C:
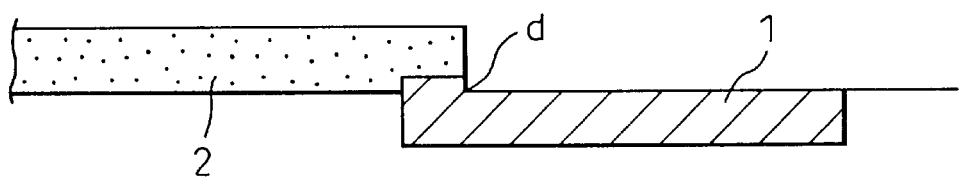
Figure 9D:
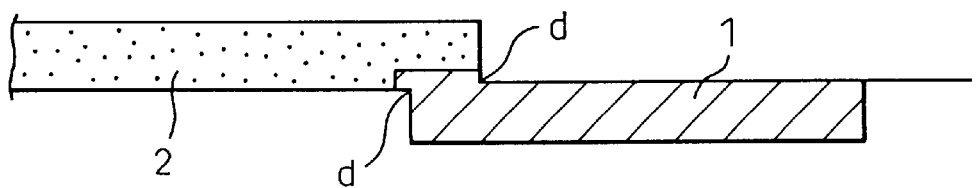

FIGS. 9A to 9D are views respectively showing still other embodiments of the present invention. FIG. 9A is a view showing an embodiment in which the forward ends of the soft material member section 1 and the molding resin section 2 are respectively formed into an inclined shape K in the melting section in which the soft material member section 1 and the molding resin section 2 are melted with each other so that the occurrence of burr can be avoided. FIG. 9B is a view showing an embodiment in which recess "r" for positioning is provided in the soft material member 1 and the metallic mold is engaged with this recess "r" so that the soft material member 1 cannot be shifted in the process of insert molding. FIGS. 9C and 9D are views respectively showing a structure in which step "d" for preventing the occurrence of burr is provided in the soft material member section 1 so as to prevent the occurrence of burr.

FIGS. 10A to 10D are views respectively showing other embodiments in which the forward end portion of the soft material member section 1 of the resin molding made by the multi-color injection molding method is corrugated. In this resin molding of the soft material member made by the multi-color injection molding method, first, hard molding resin is injected into the cavity of the metallic mold so as to form the molding resin section 2. Next, while the metallic mold is set as it is, soft molding material is injected with pressure, so that the soft material member section (flexible section or seal section) 1 melted with the molding resin section 2 is molded.

Figure 10A:
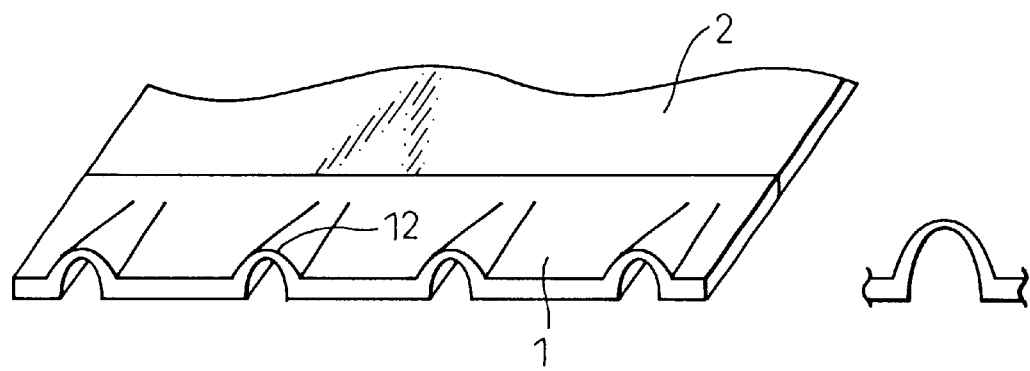
FIGS. 10A to 10D are views showing four embodiments of a corrugated shape of a flexible section of a soft material member of a resin molding made by the multi-color injection molding method which are other embodiments of the present invention.
Figure 10B:
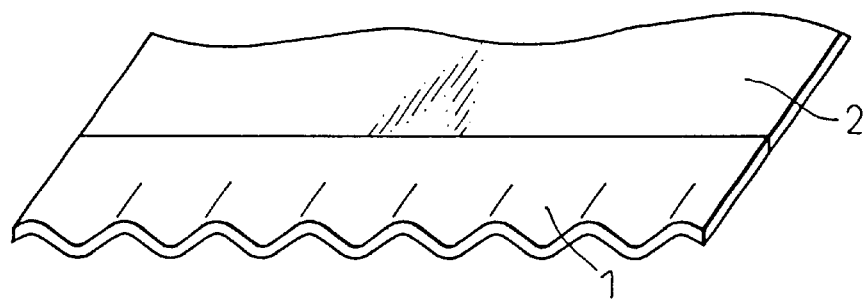
Figure 10C:
Figure 10D:
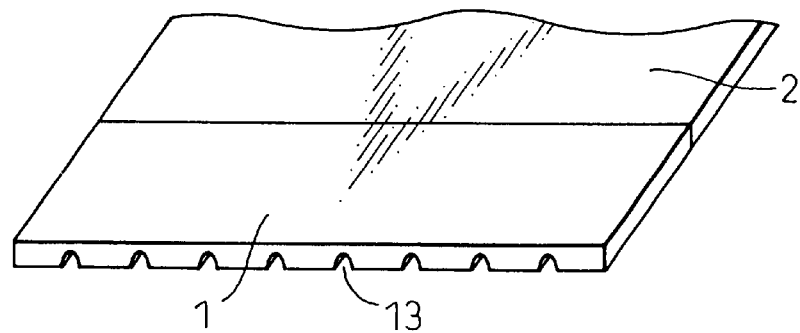

In the resin moldings of this embodiment, the profile of each soft material member section 1 is formed as follows. In FIG. 10A, a plurality of expanded portions, which are respectively formed into tapering gutter shapes, are provided on a plane at predetermined intervals. In FIG. 10B, the cross-section of the soft material member section 1 is corrugated. In FIG. 10C, the cross-section of the soft material member section 1 is formed into a saw-tooth shape. In FIG. 10D, the cross-section of the soft material member section 1 is formed in such a manner that a plurality of grooves 13, the cross-section of which is semicircular, are formed at predetermined intervals. In this connection, concerning the gutter-shaped expanded portion 12 shown in FIG. 10A, the protruding end may be made thin. In the present invention, these profiles of the forward end portion of the soft material member section 1 shown in FIGS. 10A to 10D are generically referred to as a wave-shape.

When the profile of the forward end portion of the soft material member section 1 is corrugated as described above, contraction in the width direction can be made up by the deformation of the corrugated portion. Therefore, it is possible to form a resin molding, the entire profile of which is straight.

Figure 11A:
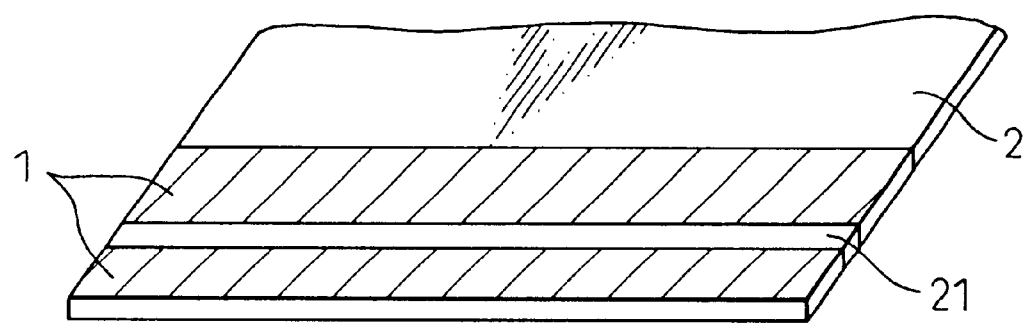
FIGS. 11A and 11B are views showing two embodiments of a resin molding made by the multi-color injection molding method in which a belt-shaped hard resin section is provided in a soft material member which are other embodiments of the present invention.
Figure 11B:
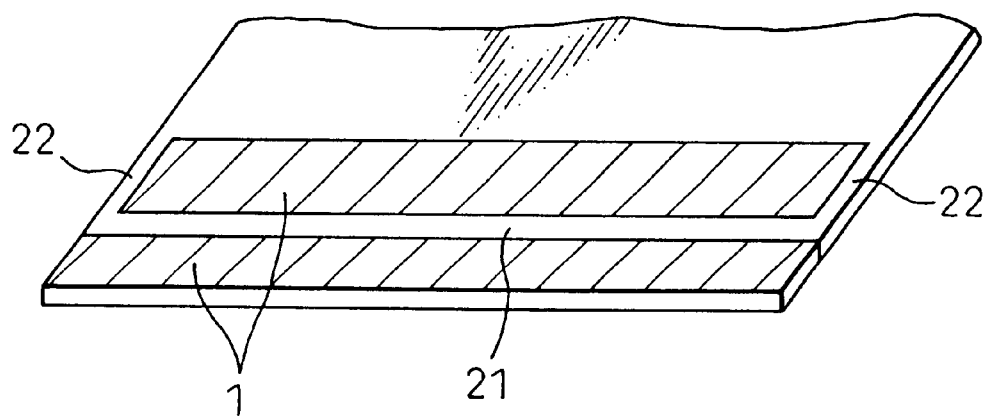

FIGS. 11A and 11B are views respectively showing a resin molding of still other embodiments of the present invention. In the same manner as that of the above embodiment, this resin molding is molded by the multi-color injection molding method. In this resin molding, there is provided a belt-shaped hard resin section 21 which divides the soft material member section 1 into two. As shown in FIGS. 11A and 11B, this belt-shaped hard resin section 21 substantially extends in parallel with the melting section of the soft material member section 1 and the hard molding resin section 2. In FIG. 11B, there is provided a resin connecting section 22 for connecting the molding resin section 2 with the belt-shaped hard resin section 21 at both end portions. However, when manufacture of the resin molding is completed, this resin connecting section 22 is removed by breaking or cutting. As described above, in the resin molding of the above embodiments, the belt-shaped hard resin section 21 is provided in the longitudinal direction in the middle of the soft material member 1. Accordingly, contraction of the forward end portion of the soft material member section can be suppressed by this belt-shaped hard resin section. Therefore, it is possible to obtain a resin molding having no deformation.

Figure 12A:
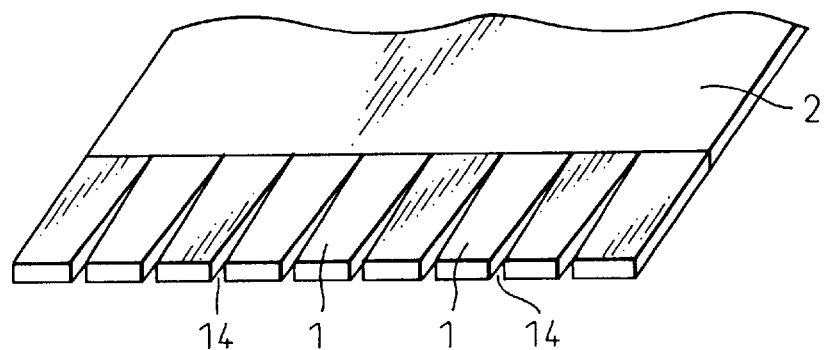
FIGS. 12A and 12B are views showing two embodiments of a resin molding made by the multi-color injection molding method in which a slit is provided in a soft material member section which are other embodiments of the present invention.
Figure 12B:
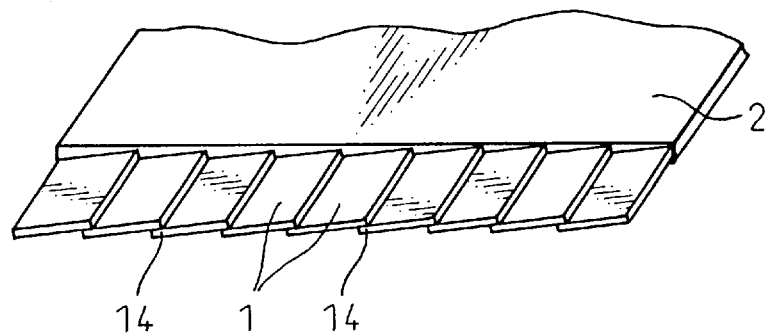

FIGS. 12A and 12B are views respectively showing a resin molding of still other embodiments of the present invention. In the same manner as that of the above embodiments, this resin molding is molded by the multi-color injection molding method. In this resin molding, there are provided a large number of slits 14 in the soft material member section 1. This slit 14 is formed in a range from the forward end of the soft material member section 1 to the melting section at a right angle with respect to the melting section between the molding resin section 2 and the soft material member section 1 or at a predetermined angle. In the embodiment shown in FIG. 12B, the soft material member section 1 is formed into a shape in which the slit portions are put on each other. This case is considered to be a variation of the slits.

As described above, in the resin molding of the above embodiments, the slits 14 are provided in the soft material member section 1. Therefore, contraction of the forward end portion of the soft material member section can be dispersed to the respective portions divided by the slits. Accordingly, it is possible to suppress the occurrence of a great deformation. In other words, since the length to be restricted is small, the deformation can be kept small.

Figure 13:
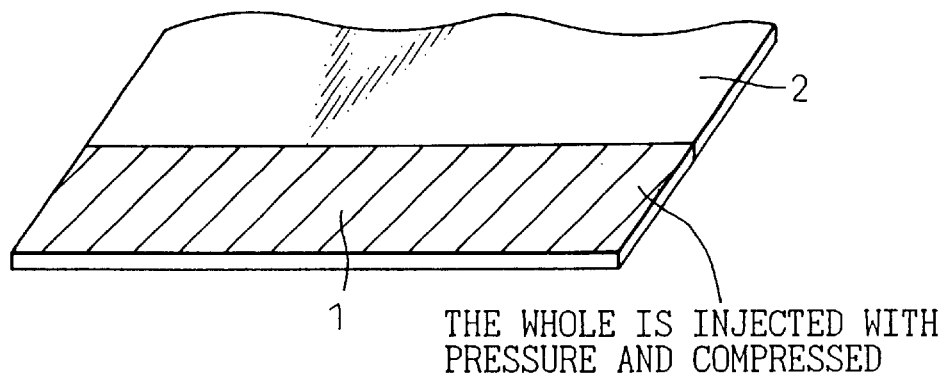
FIG. 13 is a view showing a resin molding made by the multi-color injection molding method, which is another embodiment of the present invention, the flexible section of the soft material member of which is molded by means of injection compression molding.
Figure 14A:
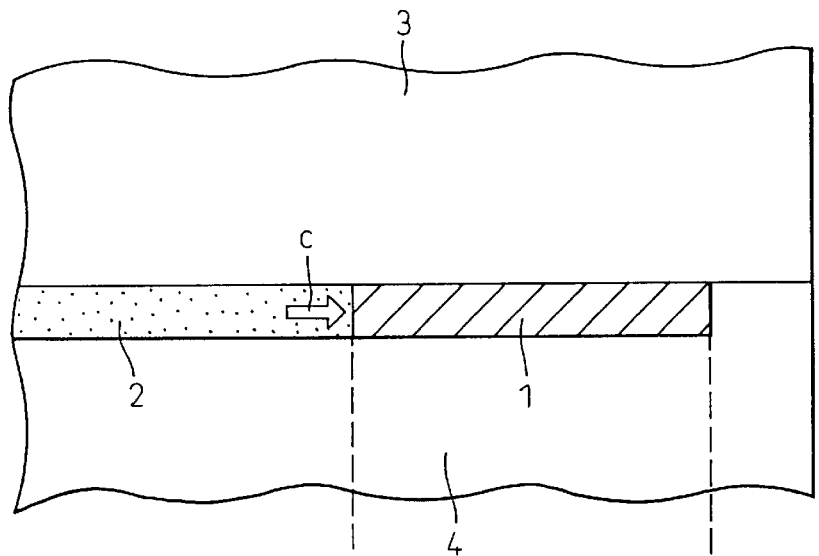
FIGS. 14A to 14C are views for explaining insert molding of a soft material member of a conventional structure.
Figure 14B:
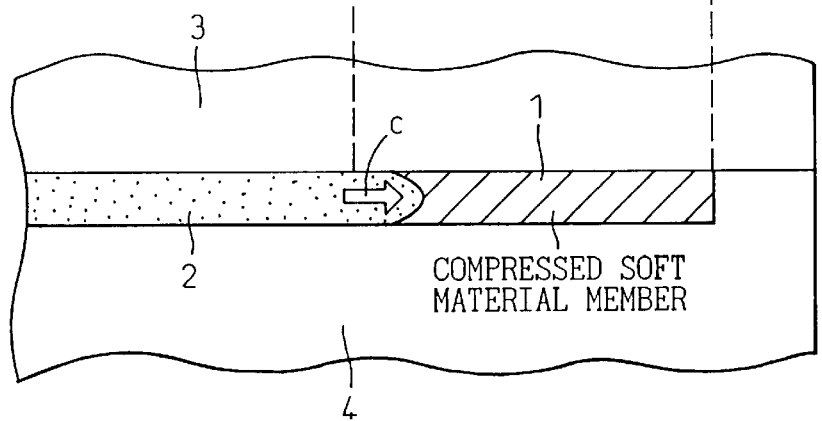
Figure 14C:
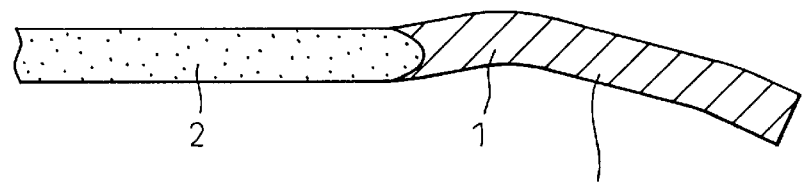
Figure 15:
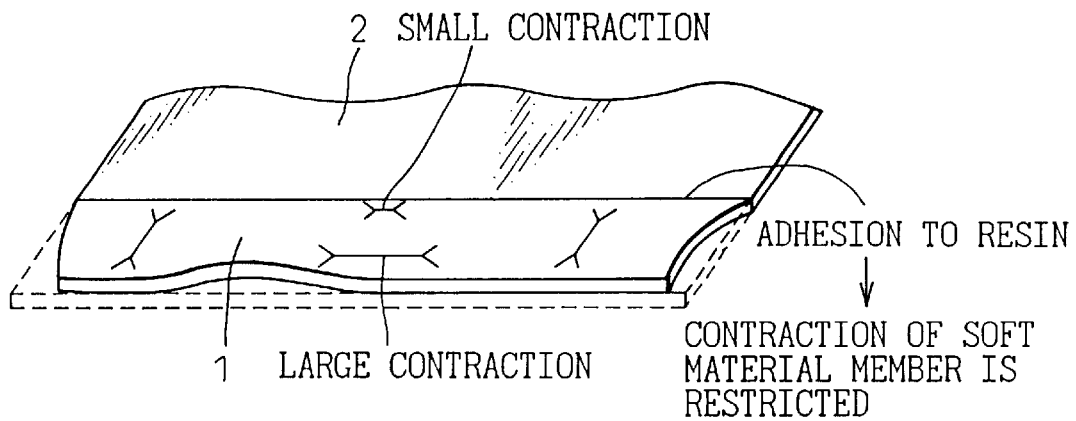
FIG. 15 is a schematic illustration for explaining deformation of a soft material member section of a resin molding made by the multi-color injection molding method.

FIG. 13 is a view showing a resin molding of still another embodiment of the present invention. This resin molding is formed by the method of multi-color injection molding and further the soft material member section 1 is formed by the method of injection compression molding. That is, a molding operation is conducted as follows. The molding resin 2 is injected with pressure into the cavity in the metallic mold. Next, the molding material of the soft material member is injected. While this molding material is being solidified, the entire soft material member section is compressed by the metallic mold. After that, the metallic mold is opened, and the thus obtained resin molding is picked up.

In a normal molding work, the contraction of the soft material member is caused in the three-dimensional directions. However, when the soft material member section is injected and compressed as described above, the contraction of the soft material member is concentrated in the thickness direction so as to suppress the contraction in the plane direction. As a result, the soft material member section of the resin molding can be prevented from being deformed.

In this connection, in the present invention, it is expected that, for example, elastomer is used as the soft material member. Therefore, the resin molding of the present invention can be used for various objects because it has an elastic soft material member.

Next, referring to FIGS. 16 and 17, a method of manufacturing the panel (resin molding) 400, especially a method of manufacturing the guide duct section 451, which is a still another embodiment of the present invention, will be explained below.

In this embodiment, the root side of the panel body section 450 of the panel 400 and also the root side of the guide duct section 451 are made of resin such as fiber reinforced polypropylene (fiber reinforced resin) into which glass fibers of 1 mm to 2 mm length are mixed so that the mechanical strength (tensile strength) can be enhanced, and the flexible section 452 is made of resin such as rubber or elastomer (simple resin) into which glass fibers are not mixed and the Young's modulus of which is low. In this connection, as shown in FIG. 16, a portion into which glass fibers are mixed is referred to as a reinforced resin section P1, and a portion into which glass fibers are not mixed is referred to as a simple resin section P2 hereinafter in this specification.

Figure 17:
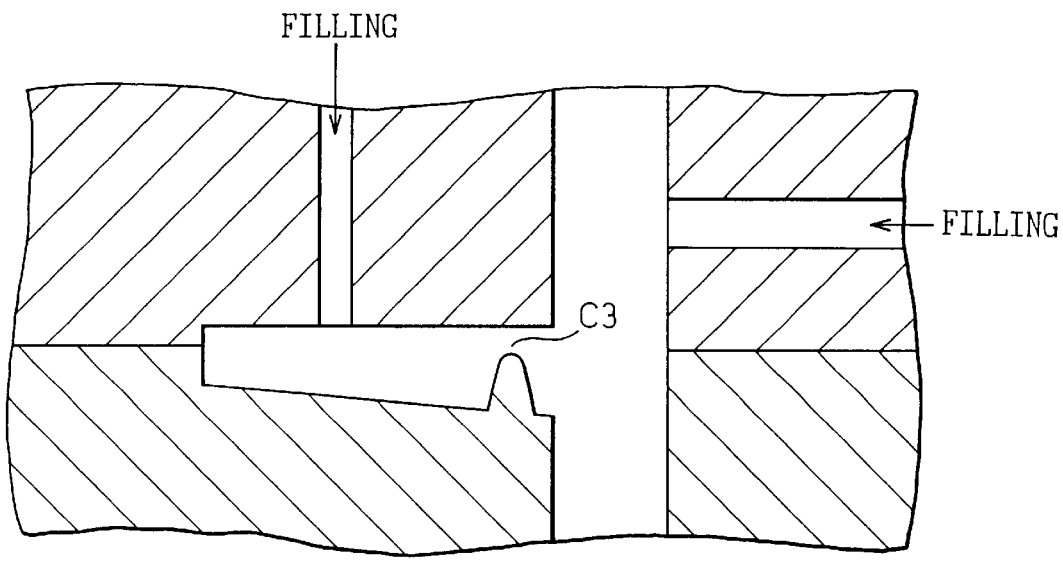
FIG. 17 is a view showing a model of a metallic mold structure of a guide duct section in a manufacturing method of an embodiment of the present invention.

FIG. 17 is a view showing a model of the metallic mold structure of the guide duct section 451. Concerning portion C3 in the metallic mold space (cavity) formed by resin molding metallic molds C1 and C2 for molding the panel 400, portion C3 corresponding to boundary surface BS between reinforced resin section P1 and simple resin section P2, the cross-sectional area (cross-sectional area of the cavity) of the metallic mold space is reduced to be smaller than the cross-sections of other portions so that the flow resistance of glass fiber reinforced polypropylene can be higher than that of other portions. When resin is filled (injected), a predetermined quantity of glass fiber reinforced polypropylene is filled into a portion in the cavity corresponding to reinforced resin section P1. After glass fiber reinforced polypropylene stops flowing, elastomer is filled into a portion corresponding to simple resin section P2 in the cavity.

Figure 16:
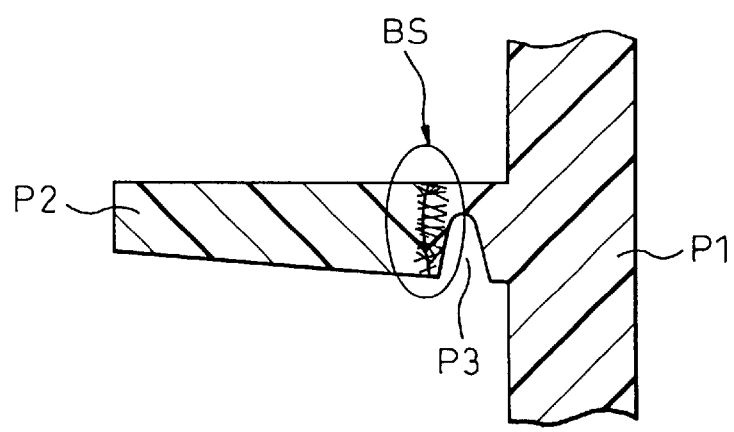
FIG. 16 is an enlarged cross-sectional view of a guide duct on a front end panel manufactured by a manufacturing method of an embodiment of the present invention.

Therefore, after the operation of molding resin has been completed, recess section P3 to reduce cross-section S of boundary surface BS is formed as shown in FIG. 16.

Next, characteristics of this embodiment will be described below.

Supposing that the guide duct section 451 of this embodiment is molded by the common multi-color injection molding method, molding operation will be conducted as follows.

Figure 18A:
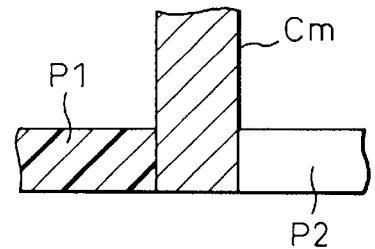
FIGS. 18A and 18B are views showing a model of a manufacturing method of the prior art.
Figure 18B:
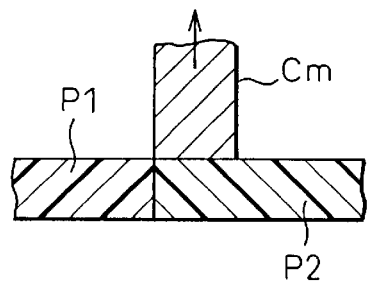

First, as shown in FIG. 18A, movable metallic mold (slide core) Cm is arranged in a portion in the cavity corresponding to the boundary surface, and glass fiber reinforced polypropylene is filled into the cavity. Then, after slide core Cm is moved (the core is backed), elastomer is filled into the cavity.

Therefore, the boundary face between glass fiber reinforced polypropylene and elastomer becomes a flat profile according to the profile of the slide core. In this case, if a large number of dimples are formed in a portion of slide core Cm corresponding to the boundary surface, it is possible to increase a contact area on the boundary surface on which glass fiber reinforced polypropylene and elastomer are contacted with each other. Therefore, the joining strength of glass fiber reinforced polypropylene to elastomer can be increased. However, when the above means is adopted, the manufacturing cost (metallic mold cost) of slide core Cm is raised. Accordingly, the manufacturing cost of the panel 400 (resin molding) is raised.

On the other hand, in this embodiment, under the condition that the flow resistance of glass fiber reinforced polypropylene is higher than that of other portions in the portion corresponding to boundary surface BS between glass fiber reinforced polypropylene and elastomer, glass fiber reinforced polypropylene is charged before elastomer. Therefore, boundary surface BS becomes a free surface not restricted by the slide core, and glass fiber reinforced polypropylene stops flowing. Therefore, at boundary surface BS, glass fibers protrude at random from the reinforced resin section P1 toward the simple resin section P2, that is, the surface becomes fluffy.

Therefore, it is possible to increase the contact area of glass fiber reinforced polypropylene with elastomer without an increase in the mold cost and without conducting a core back work. Accordingly, the joining strength of glass fiber reinforced polypropylene to elastomer can be enhanced without increasing the manufacturing cost of the panel 400 (resin molding).

Figure 19:
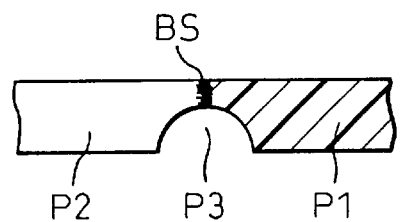
FIG. 19 is an enlarged cross-sectional view of a guide duct section incorporated into a front end panel manufactured by a manufacturing method of an embodiment of the present invention.

In this connection, "portion C3 corresponding to boundary surface BS between glass fiber reinforced polypropylene and elastomer" does not strictly mean only a portion in which boundary surface BS exists. As described before, in this embodiment, boundary surface BS is a free face not restricted by the slide core. Therefore, recess section P3 (portion C3 in which the cavity cross-sectional area is reduced) is shifted from boundary surface BS according to the fluidity (viscosity) of glass fiber reinforced polypropylene as shown in FIG. 16 in some cases, and recess section P3 coincides with boundary surface BS according to the fluidity (viscosity) of glass fiber reinforced polypropylene as shown in FIG. 19 in other cases.

"Other portions" described in the sentence of "the cross-sectional area (cross-sectional area of the cavity) of the metallic mold space is reduced to be smaller than the cross-sections of other portions so that the flow resistance of glass fiber reinforced polypropylene can be higher than that of other portions" does not mean portions except for the boundary surface BS in the overall product (panel 400), but it means "portions in the periphery of boundary surface BS except for portions close to boundary surface BS". In this case, "portions in the periphery of boundary surface BS" means portions which are larger than "portions close to boundary surface BS". Specifically, "portions in the periphery of boundary surface BS" means a range with respect to boundary surface BS shown in FIG. 16.

According to the results of experiments made by the inventors, in the case where the cross-sectional area of the cavity is reduced so that the flow resistance can be increased, it is preferable that the wall thickness is in a range not less than 5% and not more than 50% of the wall thickness which is determined by the type (viscosity) of resin or the wall thickness of a portion close to recess section P3.

Figure 20:
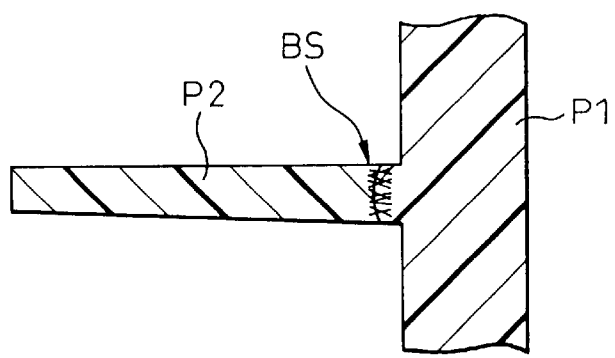
FIG. 20 is an enlarged cross-sectional view of a guide duct section incorporated into a front end panel manufactured by a manufacturing method of another embodiment of the present invention.

In this embodiment, when recess section P3, the cross-sectional area of which is locally reduced, is provided close to boundary surface BS, the flow resistance of resin (glass fiber reinforced polypropylene) is increased in portion C3 corresponding to boundary surface BS between glass fiber reinforced polypropylene and elastomer. In another embodiment, as shown in FIG. 20, when the entire wall thickness of the guide duct 451 is reduced to be smaller than that of the guide duct section 451 (two-dotted chain line) of the above embodiment, the flow of glass fiber reinforced polypropylene is regulated (stopped), so that boundary surface BS between glass fiber reinforced polypropylene and elastomer is made to be a free surface.

Figure 21:
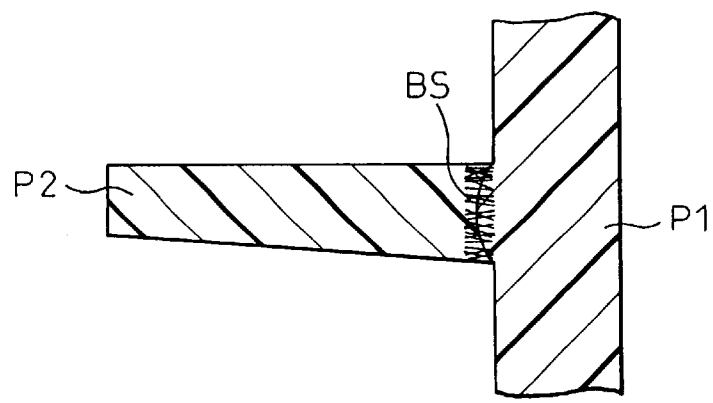
FIG. 21 is an enlarged cross-sectional view of a guide duct section incorporated into a front end panel manufactured by a manufacturing method of still another embodiment of the present invention.

In the above embodiment, when the cross-sectional area of the cavity on boundary surface BS is regulated, the flow of glass fiber reinforced polypropylene is regulated (stopped). In still another embodiment, as shown in FIG. 21, when a portion corresponding to boundary surface BS between reinforced resin section P1 and simple resin section P2 is more intensely cooled than other portions, the flow of glass fiber reinforced polypropylene is regulated (stopped).

Figure 22A:
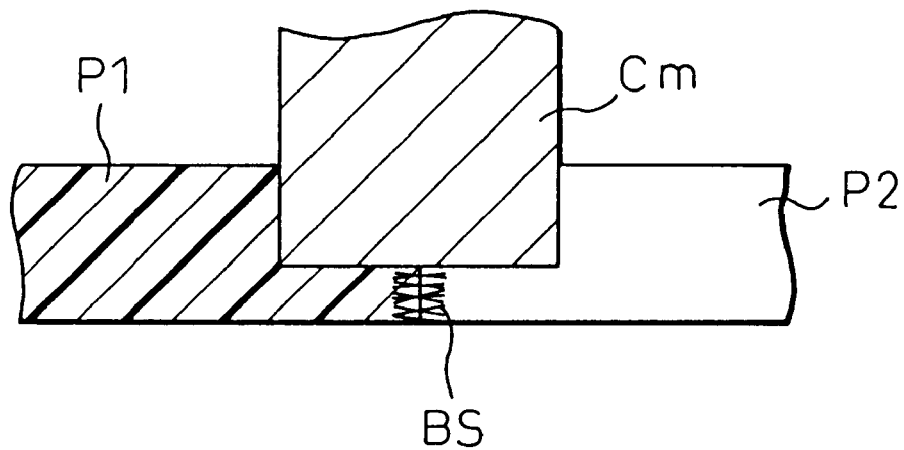
FIGS. 22A and 22B are views showing a model of a manufacturing method of still other embodiments of the present invention.
Figure 22B:
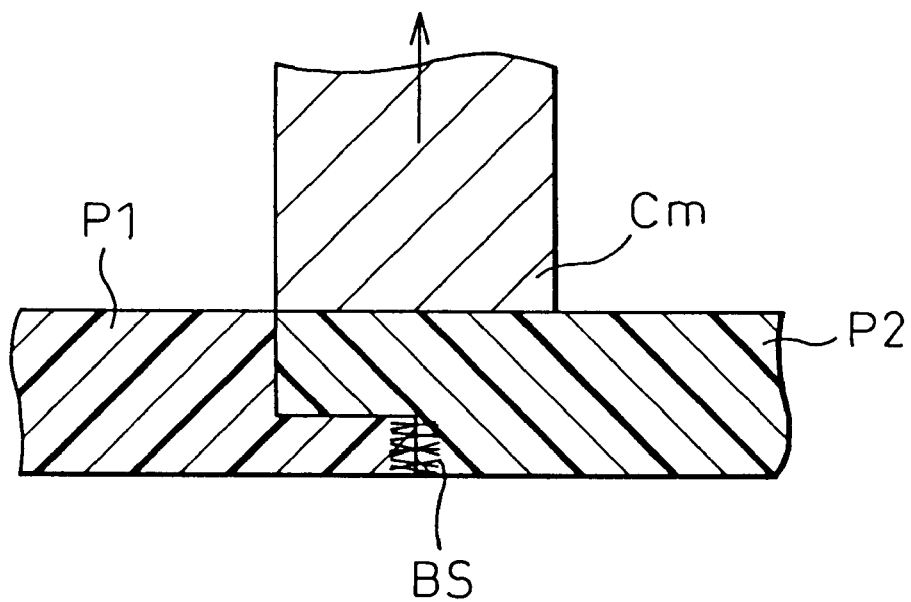

In still other embodiments, as shown in FIGS. 22A and 22B, under the condition that the flow of glass fiber reinforced polypropylene is regulated when the cross-sectional area of the cavity on boundary surface BS is reduced by slide core Cm, glass fiber reinforced polypropylene is filled into the cavity, and after the flow of glass fiber reinforced polypropylene has stopped, slide core Cm is moved, so that the cross-sectional area of the cavity is extended and elastomer is filled.

In the above embodiments, glass fibers are used as fibers. However, it should be noted that the present invention is not limited to the above specific embodiment. Other fibers such as carbon fibers and metallic fibers (metallic wires) may be used. Further, it should be noted that the length of fibers is not limited to 1 mm to 20 mm.

In the above embodiments, the front end panel of a vehicle is taken up as an example of the resin molding. However, it should be noted that the present invention is not limited to the above specific embodiment. The present invention can be applied to other resin moldings.

In the above embodiment, the present invention is explained by an example in which the resin molding is made of polypropylene and elastomer. However, it should be noted that the present invention is not limited to the above specific embodiment. The present invention can be applied to resin moldings made of other resins.

While the invention has been described by reference to specific embodiments chosen for purposes of illustration, it should be apparent that numerous modifications could be made thereto by those skilled in the art without departing from the basic concept and scope of the invention.

What is claimed is:

1. A front end panel arranged on the rear side of a bumper section to absorb an impact force acting on the front side of a vehicle, into which at least a heat exchanger is incorporated, comprising:
   a panel body section made of resin into which the heat exchanger is incorporated;
   a guide duct section made of resin integrally molded on the front side of the panel body section of the vehicle and protruded onto the front side of the vehicle so as to guide air into the heat exchanger; and
   a flexible section arranged on the end of the guide duct section and integrally molded together with the guide duct section, the flexible section made of flexible material, the mechanical strength of which is lower than that of the panel body section, the flexible section abutting the bumper section to seal a gap between the guide duct section and the bumper section.

2. A front end panel according to claim 1, wherein an end portion of the flexible section is thinner than a root portion of the flexible section.

3. A front end panel according to claim 1, wherein the end portion of the flexible section is curved so that an angle formed with respect to the longitudinal direction of the bumper section is smaller than 90°.

4. A front end panel according to claim 1, wherein a step portion is provided in a connected portion between the guide duct section and the flexible section in the direction of a plane of the guide duct section and a plane of the flexible section.

5. A front end panel according to claim 1, wherein the guide duct section and the flexible section are integrally molded by the method of multi-color injection molding, and the forward end portion of the flexible section is corrugated.

6. A front end panel according to claim 1, wherein the guide duct section and the flexible section are integrally molded by the method of multi-color injection molding, and a belt-shaped hard resin section, the mechanical strength of which is high, is provided in the flexible section substantially in parallel with a melting section between the guide duct section and the flexible section.

7. A front end panel according to claim 1, wherein the guide duct section and the flexible section are integrally molded by the method of multi-color injection molding, and a large number of slits are formed in the flexible section.

8. A front end panel according to claim 1, wherein the guide duct section and the flexible section are integrally molded by the method of multi-color injection molding, and the flexible section is further compressed in the process of molding.

9. A front end panel according to claim 1, wherein the panel body section including the guide duct section is made of fiber reinforced resin, the mechanical strength of which is enhanced by mixing fibers into resin, the flexible section is made of simple resin into which fibers are not mixed, and the fibers are protruded at random from the guide duct section toward the flexible section on a boundary surface between the guide duct section and the flexible section.

10. A front end panel according to claim 9, wherein a recess section to reduce a cross-sectional are of the boundary surface between the guide duct section and the flexible section is provided on the boundary surface.

11. A front end panel according to claim 1, wherein a deformable seal section for tightly closing a gap between the panel body and the heat exchanger is molded integrally with the panel body.

12. A front end panel according to claim 11, wherein the mechanical strength of the seal section is lower than that of the panel body section, and the seal section is made of flexible material.

13. A front end panel according to claim 11, wherein the seal section is formed into a face parallel with the direction which is perpendicular to the flowing direction of an air current flowing in the heat exchanger in the panel body.

14. A front end panel according to claim 11, wherein the seal section is adapted to be formed in a portion corresponding to a split line of a metallic mold which molds the panel body.

* * * * *